Figure 9:
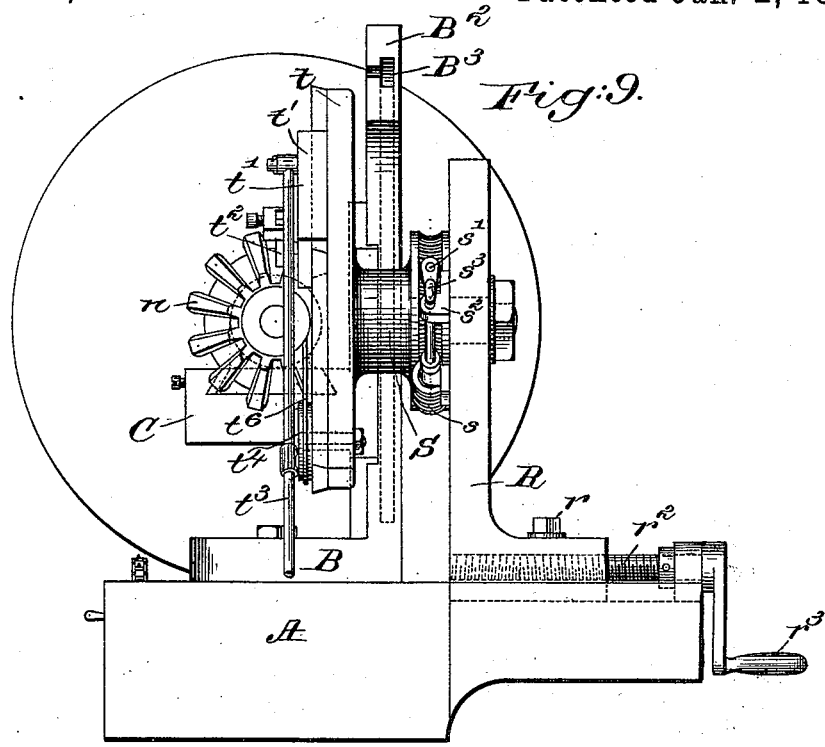

(No Model.) 3 Sheets—Sheet 1.

G. B. GRANT.
MACHINE FOR GENERATING BEVELED GEAR TEETH.

No. 512,189. Patented Jan. 2, 1894.

Witnesses.
Fred S. Greenleaf
Chas N Lowell

Inventor.
George B. Grant.
by Crosby & Gregory
attys.

(No Model.) 3 Sheets—Sheet 2.
G. B. GRANT.
MACHINE FOR GENERATING BEVELED GEAR TEETH.
No. 512,189. Patented Jan. 2, 1894.
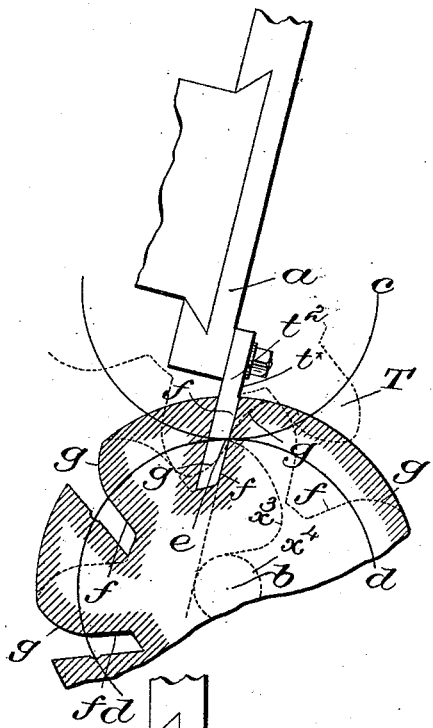
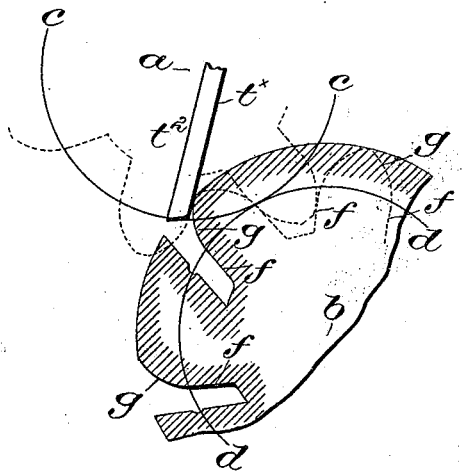
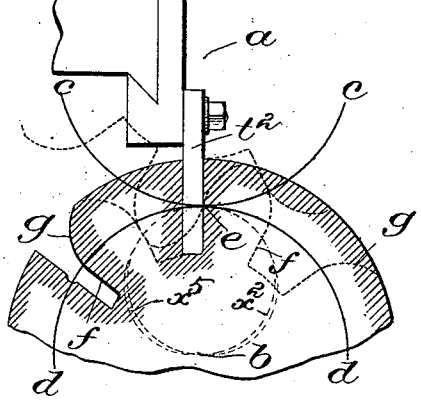
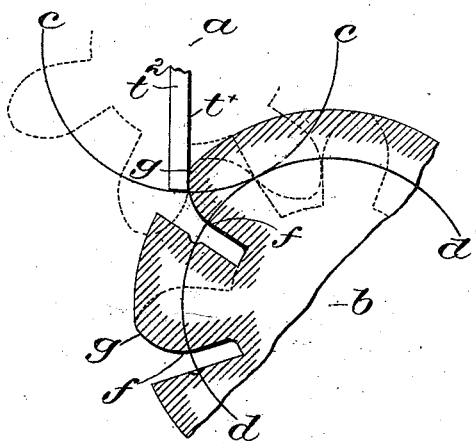
Witnesses
Fred S. Greenleaf
Louis W. Ciswell
Inventor
George B. Grant
by Crosby & Gregory Attys (No Model.)

G. B. GRANT.
MACHINE FOR GENERATING BEVELED GEAR TEETH.

No. 512,189.

3 Sheets—Sheet 3.

Patented Jan. 2, 1894.

Witnesses.
Fred S. Greenleaf
Louis Newell

Inventor
George B. Grant,
by Crosby & Gregory
Attys.

THE NATIONAL LITHOGRAPHING COMPANY,
WASHINGTON, D. C.

UNITED STATES PATENT OFFICE.

GEORGE B. GRANT, OF LEXINGTON, MASSACHUSETTS.

MACHINE FOR GENERATING BEVELED GEAR-TEETH.

SPECIFICATION forming part of Letters Patent No. 512,189, dated January 2, 1894.

Application filed February 18, 1892. Serial No. 421,958. (No model.)

*To all whom it may concern:*

Be it known that I, GEORGE B. GRANT, of Lexington, county of Middlesex, State of Massachusetts, have invented an Improvement in Machines for Generating Beveled Gear-Teeth, of which the following description, in connection with the accompanying drawings, is a specification, like letters and figures on the drawings representing like parts.

This invention relates to bevel gear teeth and the generation of the same. Generated gear teeth may be distinguished from cut gear teeth in that cut teeth are made to a copy of the tooth curve desired, such copy being either a cutter or a templet previously formed as nearly as may be to the curved form; while generated teeth are formed by a theoretical adaptation of mechanism so that it will properly form or generate a tooth in accordance with the theory of that form.

This invention is based upon the principle that if the pitch cones of two bevel gears be rolled frictionally together, without slip, any tooth form on one pitch cone will mate and run with a conjugate tooth form on the other pitch cone. Consequently when two pitch cones are rolled together, any tooth form on one pitch cone when constituted a cutting tool, will shape a tooth form on the other pitch cone which is conjugate to it; therefore a cutting tool on one pitch cone when shaped to correspond with the desired flank of a bevel gear tooth will necessarily generate a face on the other pitch cone which is conjugate to it and to the flank of the tooth with which the shape of the cutting tool corresponds, the cutting tool thus describing a surface which corresponds with the flank of a tooth of a mating gear.

A machine for generating bevel gear teeth in accordance with the foregoing principle is constructed to give to the cutting tool and the gear blank a relative movement as of the pitch cones of the two mating gears rolling one upon the other, the cutting tool being imagined as on one of the pitch cones, while the gear blank is attached to the other pitch cone. This relative motion may be obtained by imagining the axes of the pitch cones as fixed, a rolling movement being given both to the cutting tool and the gear blank; or one of the pitch cones may be imagined as stationary, while the other pitch cone carrying the gear blank or the cutting tool is rolled about it. For most practical purposes I prefer to have one imaginary pitch cone stationary and carrying the moving cutting tool, while the other imaginary pitch cone constituting the gear blank is rolled about it, the cutting tool thus describing the tooth flank surface of a gear with which the rolling gear blank is to work. A plane cutting tool having a straight cutting edge or flat surface is in every way the most simple cutting tool to employ in a machine, and I therefore prefer to employ such a tool in my machine, such a tool producing, however, a bevel gear tooth, which, though it embodies the essential characteristics above named, yet is of a shape which so far as I am aware is entirely new, such tooth consisting of flanks which are planes and faces which are curved surfaces conjugate to planes. This form of tooth differs from any bevel gear tooth heretofore known to me, in that its curved tooth surface differs from any other, and I have therefore named the tooth embodying such surface "a planoid tooth," such name being derived from its peculiar relation to the plane, as will be more fully hereinafter set forth.

This invention broadly, therefore, consists in a machine for generating bevel gear teeth, comprehending a cutting tool; a holder for the gear blank; and actuating devices to relatively change the positions of the said tool and holder as of the pitch cones of the gear blank and its mating gear (the latter pitch cone carrying the cutting tool) rolling one upon the other, whereby the said tool acting on the said blank is caused to generate a curved tooth surface conjugate to the flank of a mating tooth with which its cutting edge coincides, substantially as will be described.

Other features of this invention will be hereinafter described and particularly pointed out in the claims.

Figure 7:
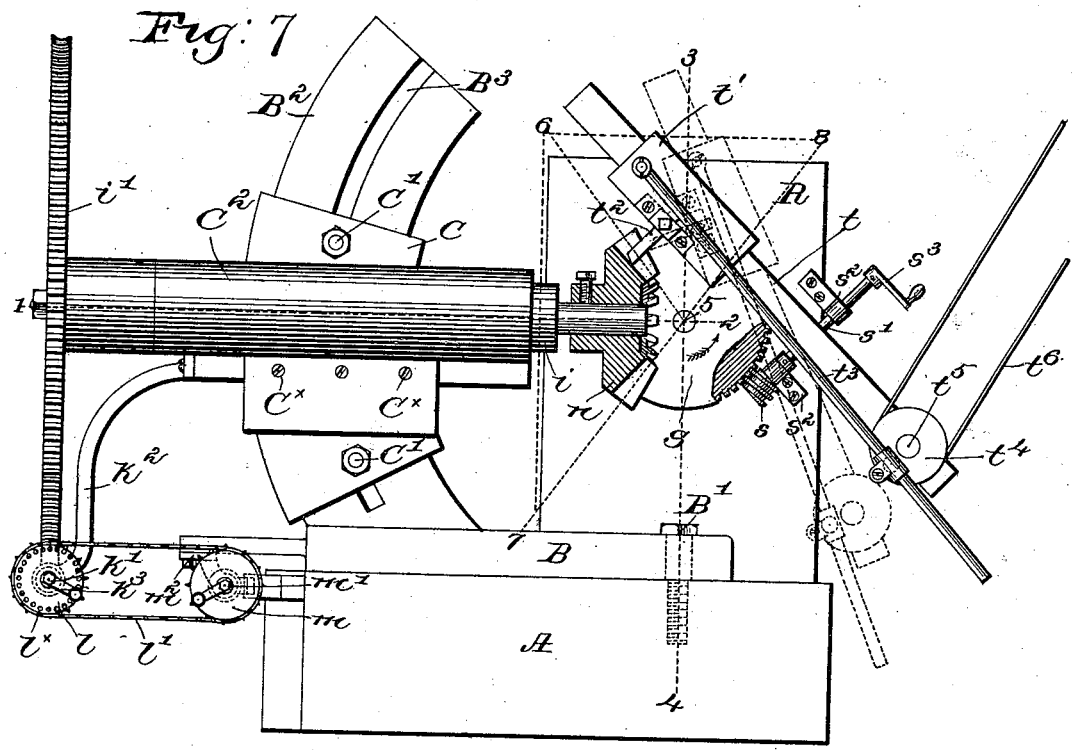
Figure 8:
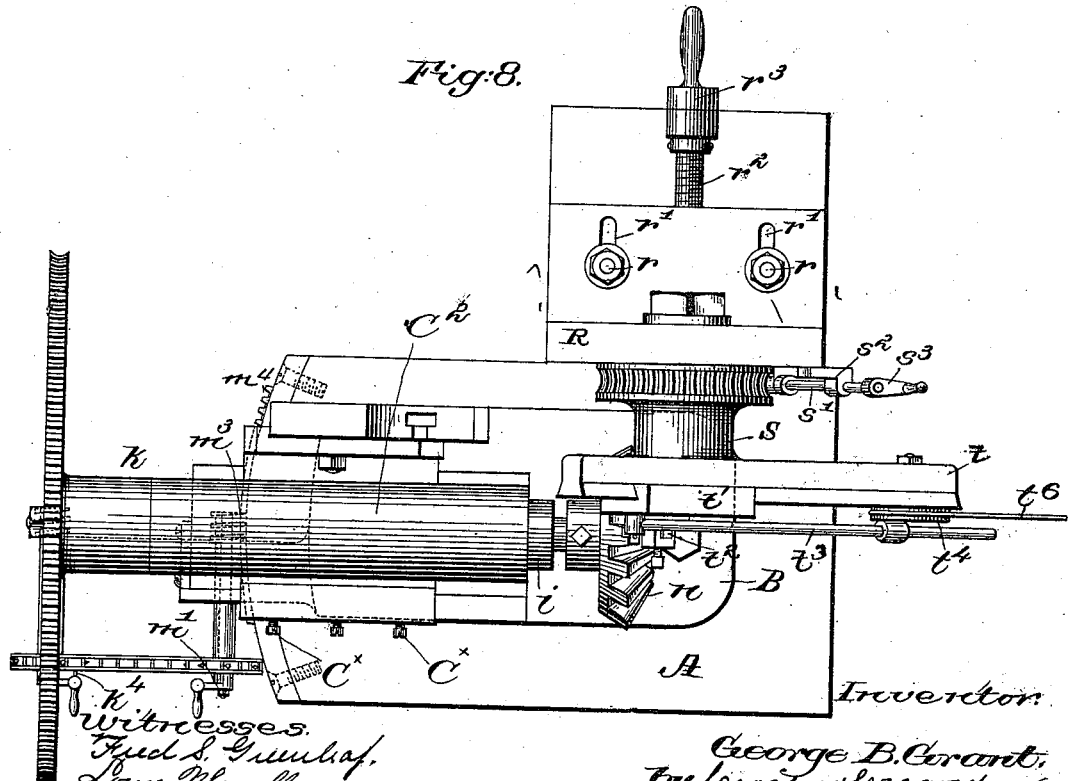

Figures 1 to 6 are diagrams illustrating my improved process of generating bevel gear teeth, the figures also illustrating a tooth formed by my improved process, having plane flanks and faces which are curved surfaces conjugate to such plane flanks; Fig. 7, a side elevation of the machine for generating bevel gear teeth in accordance with my improved process the gear blank upon which the teeth are to be generated being in section; Fig. 8, a plan view, and Fig. 9, a right-hand elevation of the machine shown in Fig. 2.

Figure 1:
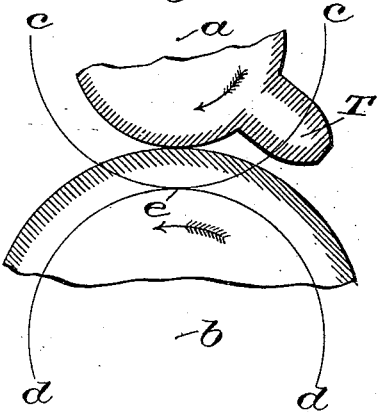
Figure 2:
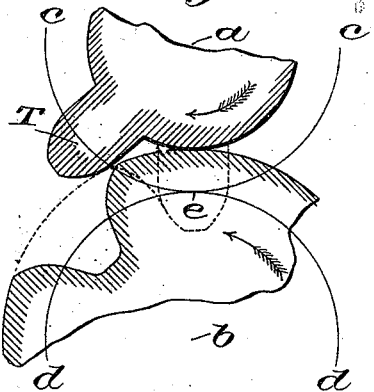

Referring first to Figs. 1 and 2 of the drawings, my improved process of generating bevel gear teeth may be described in detail as follows:—

The teeth are represented as outlined upon the surface of a sphere, the points $a$ and $b$ representing the axes of the pitch cones of the two bevel gears which are to work together; $c$ and $d$, arcs of the pitch circles or surfaces of the pitch cones, which with the pitch point $e$ lie in a great circle of the sphere.

Let $b, d$, represent the pitch cone of the gear blank, and $a—c$, the pitch cone of a gear with which the gear being cut is to work. Now, if a tooth form T be fixed to the pitch cone $a—c$, Fig. 1, and the two pitch cones rolled together in the direction of the arrows as the pitch cones of two working bevel gears would roll together, it is clear that the form T during the rolling movement will generate on the pitch cone $b—d$ a tooth form or surface which as shown in Fig. 2, must be conjugate to it, that is. the generated form Fig. 2 will be such that it will contact with the generating form T at all times while they work together during the rolling movement of the pitch cones.

In Fig. 2 the axes $a—b—$ of the two pitch cones are supposed to be fixed, the pitch cones having been rolled together about these fixed axes; but the tooth form T on the pitch cone $a—c$, will generate precisely the same form or surface on the pitch cone $b—d$ if the pitch cone $a—c$ be imagined as stationary and the cone $b—d$ rolled about it, or vice versa, if the pitch cone $b—d$ be considered as fixed and the pitch cone $a—c$ be rolled about it. If now the form T be shaped to correspond with the form which it is desired the completed tooth on $b—d$ shall partake, it follows that if the form T be considered a moving cutting tool, whether reciprocating, rotating or other form, and the pitch cone $b—d$, considered the gear blank upon which the teeth are to be generated, if the pitch cone $b—d$ be rolled about the pitch cone $a—c$, the moving cutting tool T will cut or generate a tooth surface on the gear blank which must be conjugate to it, and must therefore be conjugate to a tooth similar in shape to the cutting tool on a mating bevel gear which works with the gear $b—d$. In practice, however, it is not practicable to employ a cutting tool having the full form of a tooth, it being necessary to utilize a planing or milling tool which will generate one side of a tooth only at a time, such tool having two cutting edges or sides, one of which will be utilized in generating one face of each gear tooth, while the other side will be utilized to generate the opposite face of each tooth, the cutting tool being shifted at the proper time to bring its opposite acting side into proper position with relation to the axis of the pitch cone of the gear.

As hereinbefore stated, it also is very desirable to employ the simplest and most inexpensive form of cutting tool, and one which may be easily sharpened, and by the process of generating bevel gear teeth described, I am enabled to use a tool having a perfectly straight cutting edge or side, such a tool however producing a form of tooth hitherto unknown to me and which I have termed a "planoid tooth," the name being derived from its peculiar tooth surface. This planoid tooth surface may be strictly defined as that surface which is formed upon a body attached to the outside of an imaginary cone by a tool attached to the inside of another imaginary cone and having a motion describing a plane substantially through its apex, the two imaginary cones being tangent and rolling one upon the other.

The "planoid" tooth is represented in the diagrams Figs. 3 to 6 inclusive, partially in full and partially in dotted lines, the dotted lines representing the completed tooth, while the full lines illustrate the process of generating the tooth, and referring to said figures, $f, f$, represent the plane flanks of the mating teeth, and $g, g$, the curved faces conjugate to the plane flanks.

A peculiar feature of the "planoid" tooth is that the same tool may be used to cut or generate not only the flanks of the tooth but to sweep or generate the curved faces as well, for after the tool has cut a flank with the two pitch cones at rest, if the pitch cones be rolled together, the same tool will sweep or generate a curved face on the tooth which is conjugate to it and to a flank of a mating tooth. This will be best understood by referring to Fig. 3, wherein the two pitch cones $a—c$ and $b—d$ are supposed to be at rest and the cutting tool $t^2$ is supposed to have been moved to make a direct cut into the gear blank represented by the pitch cone $b—d$ to form a flank $f$ of a tooth. If after the cut has been made to the required depth the tool be withdrawn so that its end lies in the surface of the pitch cone $a—c$, and the pitch cone $b-d$ be rolled about the pitch cone $a—c$ into its position Fig. 4, the cutting side $t^x$ of the tool $t$ will sweep up or generate a curved face $g$ which must be conjugate to the plane cutting side of the tool, and also to the plane flank of a mating tooth in the imaginary flank surface of which the cutting side of the tool moves. This operation may be repeated until one surface of each tooth is properly generated, when the tool will be shifted as will be more fully hereinafter described, to generate in like manner the opposite surface of the tooth to complete the same as indicated by dotted lines.

The flanks of the "planoid" teeth need not necessarily lie in any particular plane, but for the best practical results both as regards the process of generating the tooth and the practical operation of the same thereafter, I prefer to have the flanks of the teeth radial planes as illustrated by Figs. 5 and 6, referring to which, in Fig. 5 the two pitch cones $a$—$c$ and $b$—$d$ are represented as stationary, the plane cutting tool having its cutting side moving in a plane radial to the axis of the pitch cone $a$—$c$, having made a direct cut into the gear blank to form a radial flank of a tooth thereon. The tool will then preferably be withdrawn as described, until its end moves in the surface of the pitch cone $a$—$c$ when the pitch cone $b$—$d$ will be moved to the right and given a movement with relation to the cutting side of the tool as of its pitch cone rolling about the fixed pitch cone $a$—$c$, when the said cutting side will sweep up or generate a curved face $g$ which must be conjugate to it and to the radial flank of a mating tooth.

One form of machine to form or generate the planoid teeth illustrated in Figs. 5 and 6 by the process described is represented in Figs. 7 to 9 inclusive, wherein A, represents a bed of suitable shape and construction to sustain the working parts; B represents an oscillating plate or carrier pivoted at B' on the bed and carrying the curved arc or arm $B^2$ in which is formed a suitable guide-way $B^3$ for the spindle head C made adjustable on and with relation to the said arc by suitable adjusting devices or bolts C', said spindle-head carrying the spindle stock $C^2$ made horizontally adjustable with relation to the head C and held in adjusted position by suitable clamping devices or screws $C^\times$. The spindle stock $C^2$ receives the spindle or gear blank holder $i$ fitted at its front end to receive the usual arbor to support the gear blank $n$ upon which the bevel gear teeth are to be cut or generated, and the said holder at its opposite end has fast upon it a master wheel $i'$ provided with worm teeth upon its periphery in mesh with and driven by a worm $k$ represented in dotted lines in the drawings, Fig. 8, and fast upon a worm shaft $k'$ journaled in a bracket $k^2$ bolted or otherwise secured to the adjustable spindle stock $C^2$. The worm shaft $k'$ in the present instance is fitted at its outer front end with a crank $k^3$ provided with a movable pin $k^4$, see Fig. 8, which pin is adapted to enter one or another of a series of circumferentially arranged holes $l^\times$ in a sprocket wheel $l$ loosely mounted on the shaft $k$, and connected by a sprocket chain $l'$ with and driving a sprocket wheel $m$ fast on a worm shaft $m'$ journaled in suitable bearings in a bracket or brackets $m^2$, forming part of or attached to the oscillating plate or carrier B, see Fig. 7, said worm shaft having a worm $m^3$ in mesh with a curved sector $m^4$ on the edge of the bed A. By withdrawing the pin $k^4$ on the crank $k^3$ from the hole $l^\times$ on the sprocket wheel $l$ with which it is in engagement, either of the worm shafts $k'$ or $m'$ may be rotated independently of each other, the worm shaft $k'$ when rotated acting through the master wheel $i'$ to cause rotation of the gear blank $n$ about its axis 1—2; while rotation of the worm shaft $m'$ acts through its worm and the curved sector $m^4$ on the bed to cause rotation or oscillation of the carrier B carrying the holder $i$ and gear blank, about its vertical axis 3—4, the two axial lines 1—2, 3—4, intersecting each other at the point 5, which forms the apex of the machine.

R represents the tool head mounted on the bed A and made adjustable thereon to vary the position of the cutting tool with relation to the blank, by means of suitable clamping bolts $r$, which pass through slots $r'$ in the foot of the tool head, said head being moved for adjustment by means of a threaded shaft $r^2$ fitted at its outer end with an operating handle $r^3$, rotation of the handle and shaft in one or the other direction moving the head R toward or from the apex of the machine.

A rotatable tool holder S journaled in the head R, has its periphery provided with teeth which are engaged by a worm $s$ fast on a shaft $s'$ journaled in suitable bearings $s^2$ carried on the head, said shaft $s'$ being fitted with a crank or operating handle $s^3$ by which it may be rotated and the tool holder thereby revolved about its axis. The tool holder S has fixed to it a guide bar $t$ on which slides the tool carriage $t'$ having clamped to it in suitable manner a planing tool $t^2$, said carriage being reciprocated on the guide-bar, by a connecting rod $t^3$ jointed to and operated by a crank $t^4$ on a driving shaft $t^5$ journaled in suitable bearings in the guide bar and driven by a belt $t^6$, as shown.

The imaginary cone represented by the dotted lines 6, 5, 7, represents the pitch cone of the gear blank being cut, while the imaginary cone represented by the dotted lines 6, 5, 8, represents the pitch cone of the mate with which it is supposed to work, and in practice the cutting tool $t^2$ will preferably be set to move in the plane of the axes 1—2, 3—4, this position of the cutting tool generating the radial form of the "planoid" tooth referred to, and the tool will also be preferably set so that its lower cutting edge will move in a line extended through the apex 5 of the machine, so as to produce a tooth having all its elements converging toward the apex of the pitch cone of the gear blank, although this latter is not essential, as will be more fully hereinafter described.

The preferable manner of operating the machine for generating ordinary bevel gear teeth is as follows:—The tool head R will first be adjusted so that the lateral cutting side of the tool $t^2$ when the same is reciprocated, will move in the vertical plane of the axes 1—2, 3—4, and preferably with its lower cutting edge in such position that it will move in a line passing through the apex 5 of the machine; the tool will then be turned back into its dotted line position Fig. 7, by rotation of the crank $s^3$ and the tool holder S. The gear blank $n$ will then be fastened upon the end of the holder $i$ and the spindle stock $C^2$ adjusted horizontally, so that the apex of the pitch cone of the gear blank will coincide with the apex 5 of the machine. With the gear blank held stationary, the shaft $t^5$ will now be set in motion by means of the belt $t^6$ to give a reciprocating movement to the cutting tool $t^2$ and the operator by grasping the handle $s^3$ on the worm shaft $s'$ will rotate the latter to cause the tool holder S to be revolved in the direction of the arrow Fig. 7, to gradually feed the reciprocating cutting tool into the gear blank and cause the tool to make a direct radial cut in the blank, as illustrated by Fig. 5, which will form one of the radial flanks of a tooth. When the flank has been cut to the desired depth, the tool holder S will by means of the crank $s^3$ be preferably revolved to withdraw slightly the reciprocating cutting tool from the cut made, the point of the tool being preferably withdrawn to about the pitch circle of the gear blank, when the operator by grasping the crank $k^3$ on the worm shaft $k'$ will gradually rotate the latter, and with the pin $k^4$ in engagement with one or another of the holes $l^\times$ on the sprocket wheel $l$, will also cause a corresponding rotation of the worm shaft $m'$, the rotation of the said worm shafts causing a rotative movement of the gear blank $n$ about its axis 1—2, corresponding to the rolling motion of the pitch cone about its axis, and also a movement bodily of the carrier B and the gear blank $n$ carried by it, about the vertical axis 3—4, giving to the blank a movement with relation to the cutting tool, corresponding to the rolling movement of the pitch cone of the gear blank upon the pitch cone of a mating gear, causing the tool to sweep or form a curved surface upon one side of the tooth, as in Fig. 6, which must be conjugate to the plane in which the lateral cutting side of the tool is which is a radial plane with relation to the axis 3—4 of the imaginary cone of the gear with which the gear blank is to work, and such curved face must necessarily be conjugate to the radial flank of a gear tooth on the mating wheel. One side of one tooth being thus formed, the handle $k^3$ will be rotated in the opposite direction, to return the carrier B to its normal position, when the pin $k^4$ will be withdrawn from the hole $l^\times$ in the sprocket wheel $l$ with which it was in engagement, and the handle $k^3$ turned to rotate the spindle $i$ to revolve the gear blank $n$ into proper position for the cutting of a corresponding face of the next tooth, when the cutting tool holder S will be again revolved in the direction of the arrow to bring the reciprocating cutting tool down to cause it to make a cut in the gear blank, and the gear blank subsequently given the rolling and rotative movement previously described for the purpose of shaping a second tooth, these operations being continued until one face of each tooth on the flank has been properly generated. The head R will then be adjusted or moved to the left Fig. 5, to thereby bring the opposite lateral cutting edge of the tool $t^2$ in a radial plane with the axes $a$ and $b$ of the pitch cones, when the machine will be manipulated in precisely the manner hereinbefore described, so that the tool will cut or form the opposite sides of each of the teeth on the gear blank, the rotation of the worm shafts $k'$, $m'$, however being in this second operation in the opposite direction from that previously described, because the cutting tool must sweep a curved surface opposite from the surface swept by it in the first operation. If the angle of the gears is to be other than a right angle, the head C will be adjusted vertically on the arc $B^2$, to thereby change the angle of the intersecting axes 1—2 and 3—4, from a right angle as shown in the drawings to the desired angle.

The relative diameters of the sprocket wheels $l$ and $m$ will be such that the oscillating movement of the carrier B to give the rolling motion to the gear blank, will be in proper ratio to the rotative movement about its axis given to the gear blank by the master wheel $i$ and its worm $k$, these sprocket wheels being made changeable so that the relative motion of the carrier B and spindle $i$ may be changed to accommodate any desired number of teeth upon the gear blank, and instead of the sprocket chain herein shown, I may use a series of change gears or other suitable connecting devices.

While I have herein shown the lower edge or point of the cutting tool as moving in a line passing through the apex 5 of the machine, still such is not essential, for the movement of the cutting tool may be theoretically in any other direction.

This invention is not limited to the particular machine herein shown and described for generating bevel gear teeth, for the machine may be varied in many respects without departing from the spirit and scope of this invention so long as the gear blank and cutting tool are given a relative movement as of the pitch cones of the blank and mating gear rolling one upon the other, whereby the cutting tool generates a curved tooth surface conjugate to the flank of a mating tooth with which the cutting edge of said tool coincides.

While I have herein shown and described a machine for generating a planoid tooth having plane radial flanks and curved planoid faces conjugate to radial flanks, still I do not limit my invention in this respect. The tooth generated by the machine herein shown is only one specific form of the planoid tooth, for the flanks of the teeth if planes may be any planes desired other than radial planes, the planoid face in each case being conjugate to the particular plane flank employed.

Generally speaking, the "planoid" tooth is one having flanks which are planes and faces which are surfaces conjugate to such plane flanks, the difference between the two specific forms of the tooth shown in Figs. 3 and 5 of the drawings, or between any other two specific forms being a difference of convenience rather than a difference in theory.

The form of "planoid" tooth represented in Figs. 5 and 6 is a close approach to the form of tooth commonly known as the "radial-flanked epicycloidal" tooth in very common use; but it is in fact an essentially different form of tooth.

Referring to Fig. 3, the line of action $x^3$ of the "planoid" tooth is a kite-shaped curve which is tangent to the circle $x^5$ to which the straight flanks $f$ are also tangent; and for a "planoid" tooth having radial flanks the line of action $x^5$ Fig. 5, passes through the axis $b$, but is still non-circular in form. The line of action of the true "epicycloidal" tooth is always a circle. The flank is never a true radial plane, but when the line of action is a circle $x^2$ passing through the axis $b$, the flank is a curved surface that approximates a radial plane. The practical difference is material, for while the plane flank of the "planoid" tooth is easily formed with common tools, the true epicycloidal flank is difficult to form and requires special tools.

The planoid tooth herein referred to forms the subject-matter of another application filed by me, Serial No. 492,186, November 27, 1893.

I claim—

1. A machine for generating bevel gear teeth, comprehending a cutting tool; a holder for the gear blank; and actuating devices to relatively change the positions of the said cutting tool and holder as of the pitch cones of the gear blank and its mating gear (the latter pitch cone carrying the cutting tool) rolling one upon the other, whereby said cutting tool acting upon said blank is caused to generate a curved tooth surface conjugate to the flank of a mating tooth with which its cutting edge coincides, substantially as described.

2. A machine for generating bevel gear teeth, comprising a straight edged cutting tool; a holder for the gear blank; and actuating devices to relatively change the positions of the said cutting tool and holder as of the pitch cones of the gear blank and its mating gear (the latter pitch cone carrying the cutting tool) rolling one upon the other, whereby said cutting tool acting upon said blank is caused to generate a curved tooth surface conjugate to the plane flank of a mating tooth with which its cutting edge coincides, substantially as described.

3. In a machine for generating bevel gear teeth, a cutting tool, a holder for the gear blank to be cut, and actuating devices to relatively change the positions of the said tool and holder whereby the tool acting on the blank is caused to generate a tooth surface having a plane flank and a curved face conjugate to the plane flank of a mating tooth, substantially as described.

4. A machine for generating bevel gear teeth, comprehending a cutting tool, a holder for the gear blank, and actuating mechanism to give to the gear blank a motion with relation to the cutting tool as of the pitch cone of the gear blank rolling upon the pitch cone of a mating gear, substantially as described.

5. A machine for generating bevel gear teeth comprehending a movable cutting tool, a holder for the gear blank and actuating mechanism to give to the gear blank a motion with relation to the cutting tool as of the pitch cone of the gear blank rolling upon the pitch cone of a mating gear, substantially as described.

6. In a machine for generating bevel gear teeth, a holder for the gear blank; mechanism to rotate the holder and gear blank about the axis of the latter, and independent mechanism to move the holder and blank about an axis at an angle to the axis of the gear blank and passing through the apex of the pitch cone of the blank, and connecting devices between the said mechanisms whereby either may be operated independently of the other and also operated one by the other, substantially as described.

7. In a machine for generating bevel gear teeth, a holder for the gear blank, mechanism to move the same about its axis, and also about an axis intersecting said axis, and a movable cutting tool having its cutting side moving in a plane passing through the latter or intersecting axis, substantially as described.

8. In a machine for generating bevel gear teeth, a holder for the gear blank, mechanism to move the same about its axis, and also about an axis intersecting said axis, and a movable cutting tool having two cutting sides, the said cutting tool and holder being adjustable one with relation to the other to cause one or the other of the cutting sides of the tool to move in a plane passing through the latter or intersecting axis, substantially as described.

9. In a machine for generating bevel gear teeth, a bed, a carrier pivoted thereon, a spindle stock on said carrier and a spindle therein to support the gear blank, a sector on the bed, a co-operating worm on the carrier, and mechanism attached to the carrier and actuated by rotation of the worm to cause rotation of the spindle gear blank, substantially as described.

10. In a machine for generating bevel gear teeth, a bed, a carrier pivoted thereon, a spindle stock on said carrier, and a spindle therein to support the gear blank, a sector on the bed, a co-operating worm on the carrier, a worm wheel to rotate the spindle, a worm to actuate the same, and a variable connection between said worms, substantially as described.

11. In a machine for generating bevel gear teeth, a bed, a holder for the gear blank, mechanism to give to the gear blank a rolling motion, a reciprocating tool carriage, and a guide therefor, made adjustable to thereby vary the line of motion of the tool radially with relation to the gear blank substantially as described.

In testimony whereof I have signed my name to this specification in the presence of two subscribing witnesses.

GEO. B. GRANT.

Witnesses:
FREDERICK L. EMERY,
EMMA J. BENNETT.